United States Patent
Collomp

(10) Patent No.: US 10,346,101 B2
(45) Date of Patent: Jul. 9, 2019

(54) METHOD OF NESTING THREE-DIMENSIONAL PRINT OBJECTS

(71) Applicant: Océ Holding B. V., Venlo (NL)

(72) Inventor: Jérome Collomp, Venlo (NL)

(73) Assignee: OCÉ HOLDING B.V., Venlo (NL)

( * ) Notice: Subject to any disclaimer, the term of this patent is extended or adjusted under 35 U.S.C. 154(b) by 0 days.

(21) Appl. No.: 15/967,838

(22) Filed: May 1, 2018

(65) Prior Publication Data

US 2018/0329658 A1    Nov. 15, 2018

(30) Foreign Application Priority Data

May 9, 2017   (EP) .................................... 17170107

(51) Int. Cl.

| | | |
|---|---|---|
| *G06F 3/12* | (2006.01) | |
| *B29C 64/20* | (2017.01) | |
| *B33Y 50/00* | (2015.01) | |
| *B29C 64/386* | (2017.01) | |
| *B33Y 30/00* | (2015.01) | |
| *H04N 1/00* | (2006.01) | |
| *B29C 64/393* | (2017.01) | |

(52) U.S. Cl.
CPC ............ *G06F 3/1208* (2013.01); *B29C 64/20* (2017.08); *B29C 64/386* (2017.08); *B29C 64/393* (2017.08); *B33Y 30/00* (2014.12); *B33Y 50/00* (2014.12); *G06F 3/1206* (2013.01); *G06F 3/1248* (2013.01); *G06F 3/1297* (2013.01); *H04N 1/0066* (2013.01); *G06F 2217/32* (2013.01)

(58) Field of Classification Search
CPC .... G06F 3/1208; G06F 3/1297; G06F 3/1206; G06F 3/1248; H04N 1/0066
See application file for complete search history.

(56) References Cited

U.S. PATENT DOCUMENTS 6,980,934 B1    12/2005    Sadovnik

FOREIGN PATENT DOCUMENTS

| WO | WO 2011/100978 A1 | 8/2011 |
|---|---|---|
| WO | WO 2016/041955 A1 | 3/2016 |

OTHER PUBLICATIONS

Search Report issued in European priority application 17170107, dated Oct. 16, 2017.

*Primary Examiner* — Eric A. Rust
(74) *Attorney, Agent, or Firm* — Birch, Stewart, Kolasch & Birch, LLP

(57) ABSTRACT

A method of nesting three-dimensional print objects on a print surface of a printer, wherein the locations for the print objects on the print surface are determined in view of the shape and size of the footprints of the objects so as to minimize the surface area required for accommodating the objects, and the locations for the print objects are determined also in view of intended heights of the objects, and objects with equal or similar height are grouped together, the method comprising a step of grouping the objects into classes of objects with similar heights, and a step of nesting the objects class by class, wherein the method is performed on a printer having a print head movable relative to the print surface in a main scanning direction and sub-scanning direction normal to the main scanning direction, and wherein the objects of each class are nested in a separate shelf that extends in the main scanning direction on the print surface and has a constant width in the sub-scanning direction.

20 Claims, 5 Drawing Sheets

METHOD OF NESTING THREE-DIMENSIONAL PRINT OBJECTS

CROSS REFERENCE TO RELATED APPLICATIONS

This application claims priority under 35 U.S.C. § 119(a) to application Ser. No. 17170107.1, filed in Europe on May 9, 2017, the entire contents of which is hereby incorporated by reference into the present application.

BACKGROUND OF THE INVENTION

Field of the Invention

The invention relates to a method of nesting three-dimensional print objects on a print surface of a printer, wherein the locations for the print objects on the print surface are determined in view of the shape and size of the footprints of the objects so as to minimize the surface area required for accommodating the objects, and the locations for the print objects are determined also in view of intended heights of the objects, and objects with equal or similar height are grouped together, the method comprising a step of grouping the objects into classes of objects with similar heights, and a step of nesting the objects class by class.

Background of the Invention

Nesting algorithms for placing two-dimensional print objects with regular or irregular shapes on a print substrate or print surface are well known in the art. The purpose of the nesting algorithms is to arrange the print objects in a configuration as compact as possible in order to minimize the consumption of media sheet material and, in case of a printer with a scanning-type print head, in order to permit a high printing efficiency by minimizing the distance of travel of the print head.

A nesting method according to the preamble of claim 1 has been disclosed in WO 2011/100978 A1.

U.S. Pat. No. 6,980,934 B1 discloses a method of nesting 3D objects in a target volume.

WO 2016/041955 A1 discloses a method wherein a plurality of print objects are printed onto separate print substrates which have different thicknesses. In that case the z-position of the print head in the direction normal to the print surface has to be adapted to the thickness of the print substrates, and in order to rationalise the print process, the print objects and their print substrates are nested such that substrates with equal or similar thickness are disposed adjacent to one another so that they can be printed in a continuous scan pass without having to adapt the height of the print head in-between.

Applicant has been observed that in the prior art methods quality issues sometimes arise in the form of the printed surface having colours that are inconsistent between different printed objects (in the same batch), height deviations, and cracking of the printed surface.

It is an object of the invention to improve the print quality in 3D or relief printing.

SUMMARY OF THE INVENTION

In order to achieve this object, according to the invention, the method is performed on a printer having a print head movable relative to the print surface in a main scanning direction and sub-scanning direction normal to the main scanning direction, and in that the objects of each class are nested in a separate shelf that extends in the main scanning direction on the print surface and has a constant width in the sub-scanning direction.

In 3D printing, the print objects have a certain extension or height in the z-direction normal to the print surface. Print applications in which the height of the objects is relatively small are frequently termed "relief printing" or "2.5D printing". In the present disclosure, the term "three-dimensional" or "3D" shall be used as a generic term for relief printing and true 3D printing.

The 3D print objects are printed in several scan passes, wherein a layer of ink is applied in each pass. A newly applied ink layer is cured, e.g. by irradiating it with UV light, so that the newly applied ink becomes solid before the next ink layer is printed. As the height of the object increases in the course of the print process, the z-position of the print head or print heads (for different colours) is adapted. Naturally, printing an object with a larger height will require a larger number of scan passes.

The quality issues observed with the prior art methods were actually inversely correlated with the height of the printed objects. Even more specific; it appeared that printed objects in proximity to other and higher printed objects were more prone to these quality issues. Further investigation showed that the observed quality issues were caused by overcuring of the lower printed objects. Once the lower objects are printed, the print head still keeps on passing over the lower objects as it is still making scanning movements to print the higher objects that are in proximity to the lower, already printed object. When the print head passes over the higher object to deposit ink on the higher object, the deposited ink is also cured, for example by radiating the ink, to solidify the deposited ink. However, it cannot be completed prevented that the ink of the lower, already printed object is at least partly cured too during the same curing operation resulting in overcuring of the lower, already printed object. The excessive amount of curing occurring thus results to some extent in colour deviation, volume changes, and surface cracking.

An advantage of the present invention is obtained in cases where curing means such as radiation sources are carried on the print heads or on a print head carriage. In that case, in order to obtain a high print quality, it is required that the intensity of curing is adjusted properly and is neither too large nor too small. When the print objects are arranged on the print surface without paying attention to the heights of the objects, higher and lower print objects will be interleaved on the print surface, and when the print head and the curing means scan the print surface while printing the top layers of the higher objects, the top surfaces of the less high objects which had been cured already will be cured again and again, so that the curing intensity may become too high, and the print quality will be degraded. Since, according to the invention, the higher objects are grouped together, the top layers of the higher objects can be printed while the scan movements of the print head are confined to the restricted area where the higher objects are located, and over-curing of the less high objects can be avoided.

By grouping objects to be printed with a similar height and arrange these groups such that they extend in the direction of the main scanning direction of the print head, all objects produced during the same main scan movements have a similar height and the building up of these objects completes after a more-or-less similar amount of passes by the print head resulting in the proper amount of curing for all objects.

The method according to the invention, requiring that objects with equal or similar height are grouped together, may lead to a configuration which may be not quite as compact as would be achieved with conventional nesting algorithms which disregard the height of the objects, but the invention has the additional advantage that it permits to reduce the distance of travel of the print head because, when the print objects with a lower height have been completed, the print head needs to scan only those shelves of the print surface which contain objects with a larger height. Moreover, the objects with lower height will generally be formed at locations which are remote from the area where the higher objects are still being printed, and it is therefore possible to cut the print substrate (if the objects are printed on a common media sheet), to remove the printed objects from the print surface and to package them while the printer is still busy with printing the higher objects (or vice versa), and yet there is no substantial risk that an operator or tools used for cutting or removing the printed objects collide with the print head.

The printer used for carrying out the invention is of a type wherein the print head moves in a main scanning direction along a gantry and the gantry moves relative to the print surface in a sub-scanning direction normal to the main scanning direction. The print objects with equal or similar height are aligned in the main scanning direction, whereas objects with significantly different heights are offset relative to one another in the sub-scanning direction. The print head may then perform complete scan passes in the main scanning direction, which assures a high positional accuracy of the ink dots being printed, and the scanned area can be confined by limiting the range in which the gantry moves in the sub-scanning direction.

The print surface is divided into stripe-shaped areas which extend in the main scanning direction and are designated as "shelves" hereinafter. Print objects of different heights are nested in different shelves, so that the print objects within a shelf will always have essentially the same height. Then, for nesting the objects within a single shelf, it is possible to use the well known and readily available nesting algorithms that are presently being used in two-dimensional printing.

Depending upon the type of ink and the curing method, certain height differences between the print objects within the same shelf may be tolerated. In that case the required number of shelves may be smaller than the number of different object heights occurring in the set of objects to be printed. Consequently, the size of the shelves will be larger which makes the conventional two-dimensional nesting algorithms more powerful.

More specific optional features of the invention are indicated in the dependent claims.

BRIEF DESCRIPTION OF THE DRAWINGS

Embodiment examples will now be described in conjunction with the drawings, wherein.

DETAILED DESCRIPTION OF THE PREFERRED EMBODIMENTS

Figure 1:
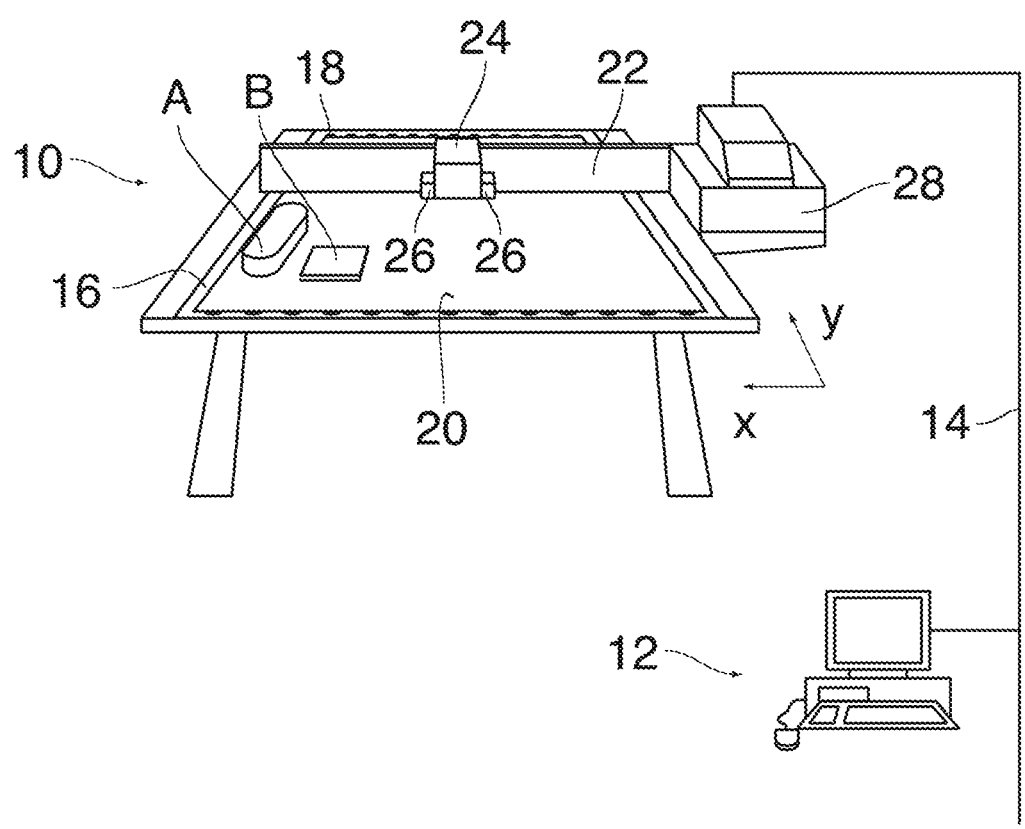
FIG. 1 is a schematic view of a printing system to which the invention is applicable.

FIG. 1 shows a printing system comprising a flat bed printer 10 and a workstation 12 connected to the printer via a network 14 and permitting to compile and edit print jobs to be executed with the printer 10.

The printer 10 has a flat bed with a rectangular print surface 16 in which a regular pattern of suction holes 18 has been formed. The suction holes are connected to a vacuum source, so that a print substrate 20, e.g. a rectangular sheet of paper, can be sucked against the print surface so as to be immobilized on the flat bed.

A gantry 22 extends across the print surface 16 in a main scanning direction x and is itself movable relative to the print surface in a sub-scanning direction y. A print head 24, e.g. an ink jet print head, is driven for reciprocating movement along the gantry 22 in the main scanning direction x and is controlled to eject a curable ink, e.g. UV-curable ink, onto the print substrate 20 in several superposed layers so as to form three-dimensional print objects A, B. UV curing lamps 26 are attached to both ends of the print head so that printed ink dots may be cured after a well defined dwell time regardless of the direction of movement of the print head.

The movements of the gantry 22 and of the print head 24 and the ejection of ink by the print head are controlled by a print controller 28.

Before the print process starts, a nesting algorithm is employed for placing the print objects (i.e. objects still to be printed), such as the objects A and B, on the print surface 16 in a layout which permits a printing efficiency as high as possible and at the same time minimizes the consumption of sheet material of the print substrate 20.

Figure 2:
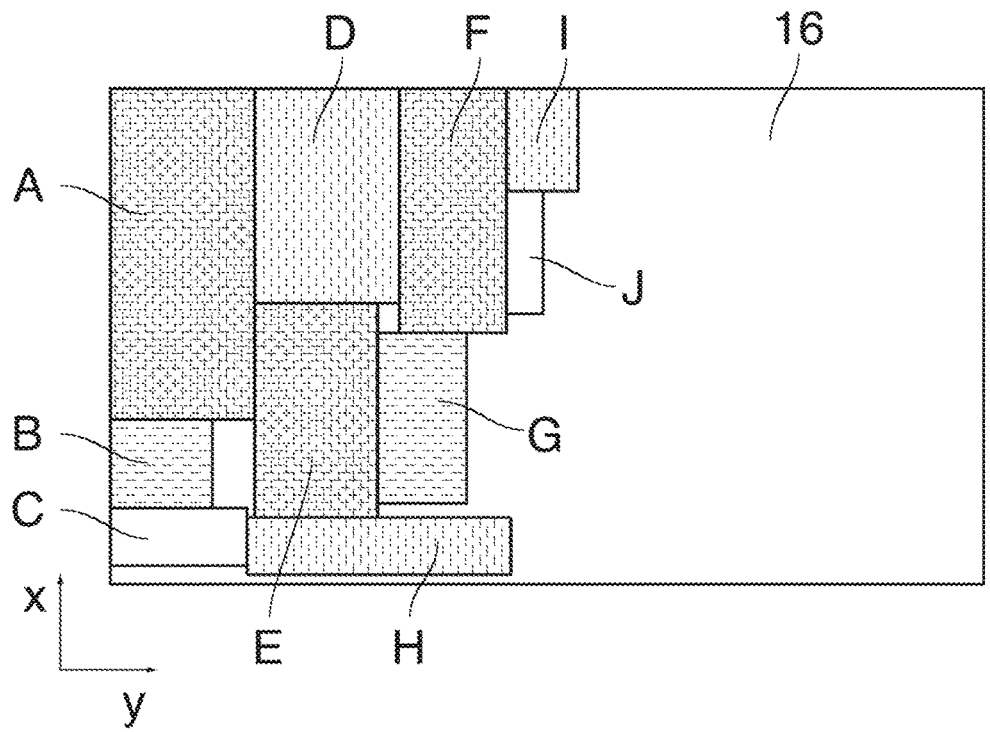
FIG. 2 is an example of a conventional layout of print objects on a print surface.

FIG. 2 shows an example of a layout that has been obtained by using a conventional nesting algorithm for placing print objects A-J on the print surface 16. The print objects have been represented by their rectangular bounding boxes. The nesting algorithm that has been used here has taken into account only the lengths and the widths of the bounding boxes and has employed a set of rules assuring that the space available on the print surface 16 is filled as completely as possible in the main scanning direction, in order to be able to print as many objects as possible in a common scan pass, and the layout is as compact as possible in the sub-scanning direction y, so as to minimize the total number of required scan passes.

Figure 3:
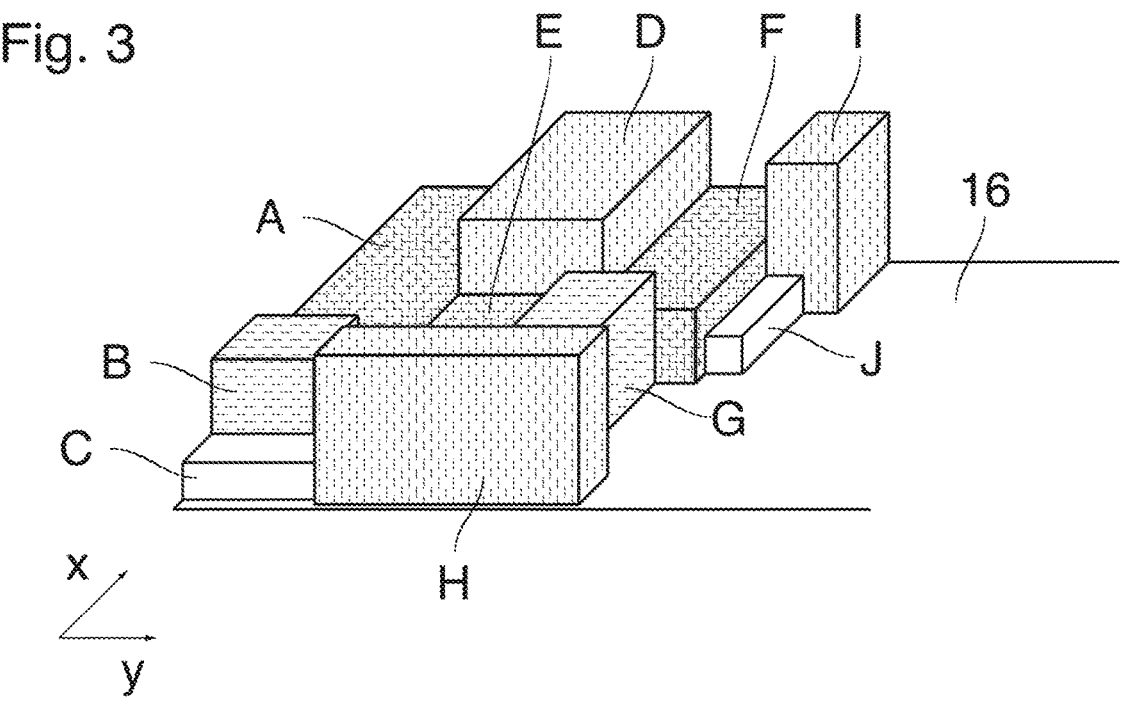
FIG. 3 is a schematic perspective view of the three-dimensional print objects in the layout shown in FIG. 2 (with object heights being exaggerated)

FIG. 3 shows the same layout as FIG. 2, but in a perspective view so as to visualize the different heights of the print objects A-J. It can be seen that the heights of the objects are distributed irregularly over the print surface 16. A suitable measure for the height of the print objects is the number of ink layers composing the object and, accordingly, the number of scan passes required for printing the object. By way of example it is assumed that the objects C and J in FIGS. 2 and 3 have a height 5 (5 layers), the objects A, E and F have the height 10, the objects B and G have the height 15 and the objects D, H and I have the height 20.

Consequently, when the objects A, B and C are being printed, the print head has to scan swathes extending in the main scanning direction x along the left margin of the print surface 16 in FIG. 2 fifteen times, because the object B has the height 15. After the first five scan passes the object C has been completed. Nevertheless, the print head 24 and the curing lamps 26 are still moved over the entire width of the print surface, because this permits a higher accuracy of the positions of the printed ink dots in the direction x. For example, a point in time when the print head passes the left or right edge of the print substrate 16 (as seen in the sub-scanning direction y) may be taken as a common time reference for the timings at which the individual nozzles of the print heads are fired. Moreover, moving the print head carriage only over smaller distances in the main scanning direction x would increase the frequency of acceleration and deceleration phases for the carriage and would increase the wear on the drive system.

After ten scan passes, the object A has also been completed, so that the print head is idle most of the time during a scan pass and is active only when passing over the object B which is still being printed. The long idle times of the print head result in a poor printing efficiency.

Moreover, the top surface of the object C has been cured with a sufficient intensity by one of the curing lamps 26 in the fifth scan pass. However, since the print head carriage performs ten further scan passes in order to print the object B, and since it is convenient or mandatory in many printers to keep the curing lamps 26 switched on permanently, the top surface of the object C is exposed to curing light in as many as ten additional scan passes. This may result in an over-curing of the top layer of ink of the object C and, as a consequence, in an undesired change of the color of the top ink layer.

In general, each type of ink has its own exposure characteristic requiring that the total exposure time is within a certain range which is limited by relatively narrow tolerance boundaries. The layout shown in FIGS. 2 and 3 has the effect that the tolerance boundaries for the exposure time are exceeded for many objects, not only for the object C but also for the objects E and F and even more for the object J which would be cured sixteen times in total.

Figure 4:
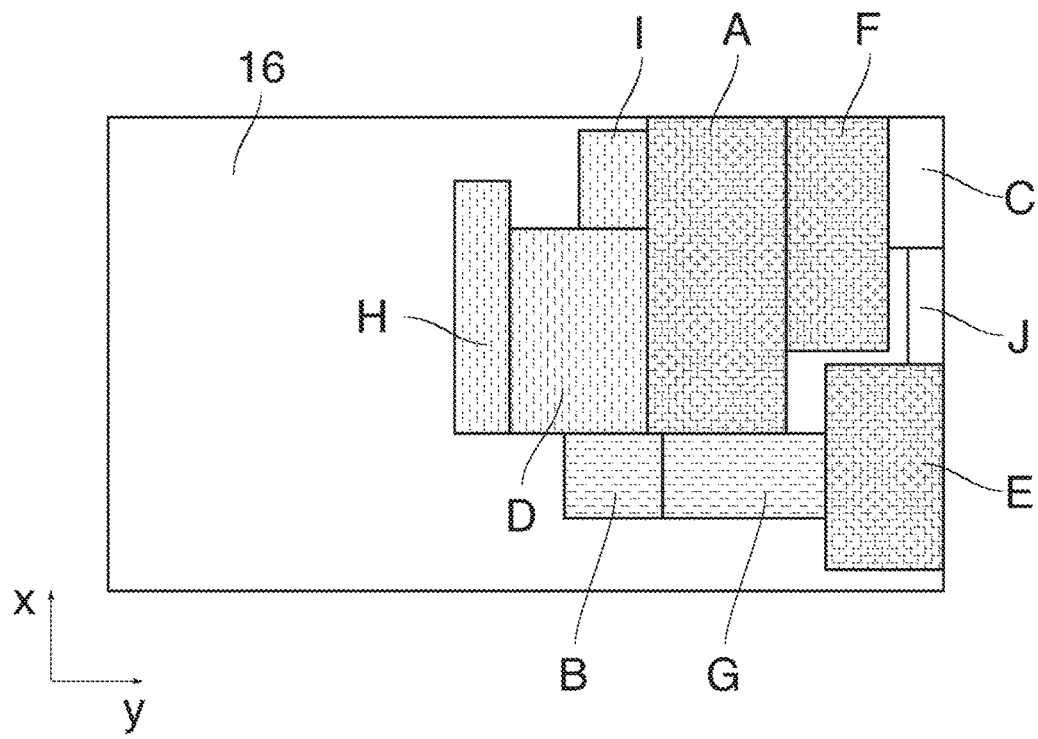
FIGS. 4 and 5 are a top plan view and a perspective view of a layout obtained by a method according to the invention.
Figure 5:
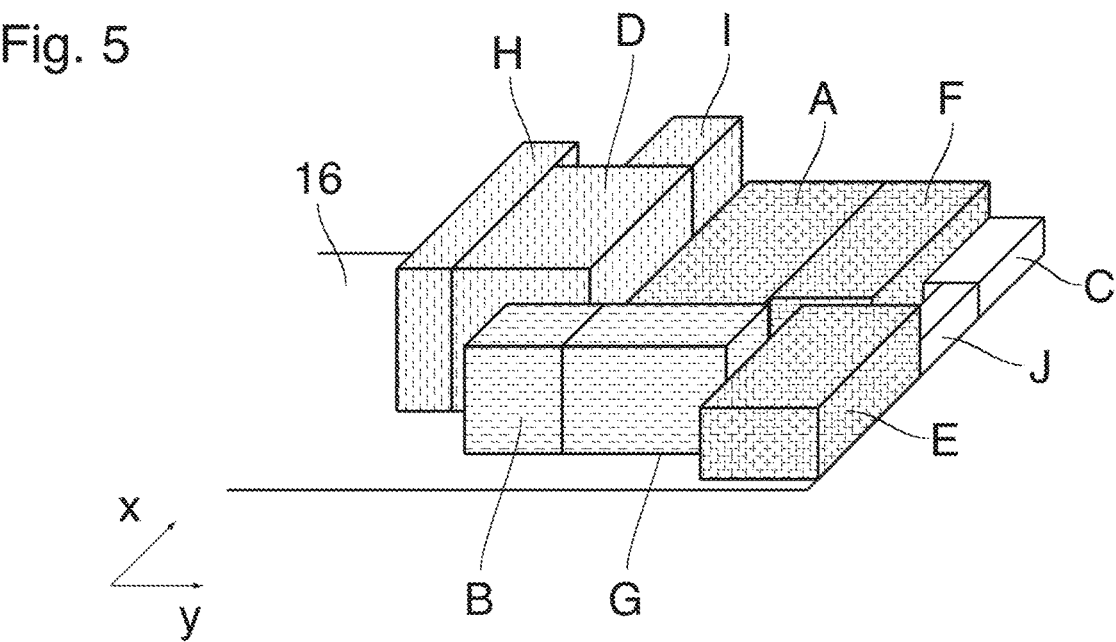

FIGS. 4 and 5 show a layout in which the same print objects A-J as in FIGS. 2 and 3 have been placed by means of a nesting algorithm according to the invention, which takes the different heights of the objects into account and aims at grouping together objects of equal or similar height. In this example, the objects A-J have first been sorted by their heights, and the nesting method has started with first placing the objects C and J with the lowest height, this time starting at the right edge of the print surface 16. Then, the objects A, E and F with the second lowest height have been placed, followed by the objects B and G with the third lowest height, and finally the objects D, H and I with the largest height have been placed.

In this case, when the objects C and J have been completed, the print head has to perform only five further scan passes in order to print the object E, so that the over-curing of the objects C and J is reduced significantly. Further, since the objects C, J, E and F have only a maximum height of ten, these objects can be printed within a relatively short time, and as soon as the object F has been completed the print substrate 20 may be cut and the objects C, J, E and F may be packaged already while the printer is still busy with printing the objects A and G. Similarly, the objects A and G can be packaged as soon as the object G has been completed, and the over-curing of the top layer of object A will be limited to five scan passes. Further, when the objects B, D, I and H are printed, the over-curing will in no case be larger than five scan passes, and the objects I, D and B can be removed and packaged already while the object H is still being printed.

In this way, the method according to the invention achieves a significant improvement in print quality and printing efficiency.

Figure 6:
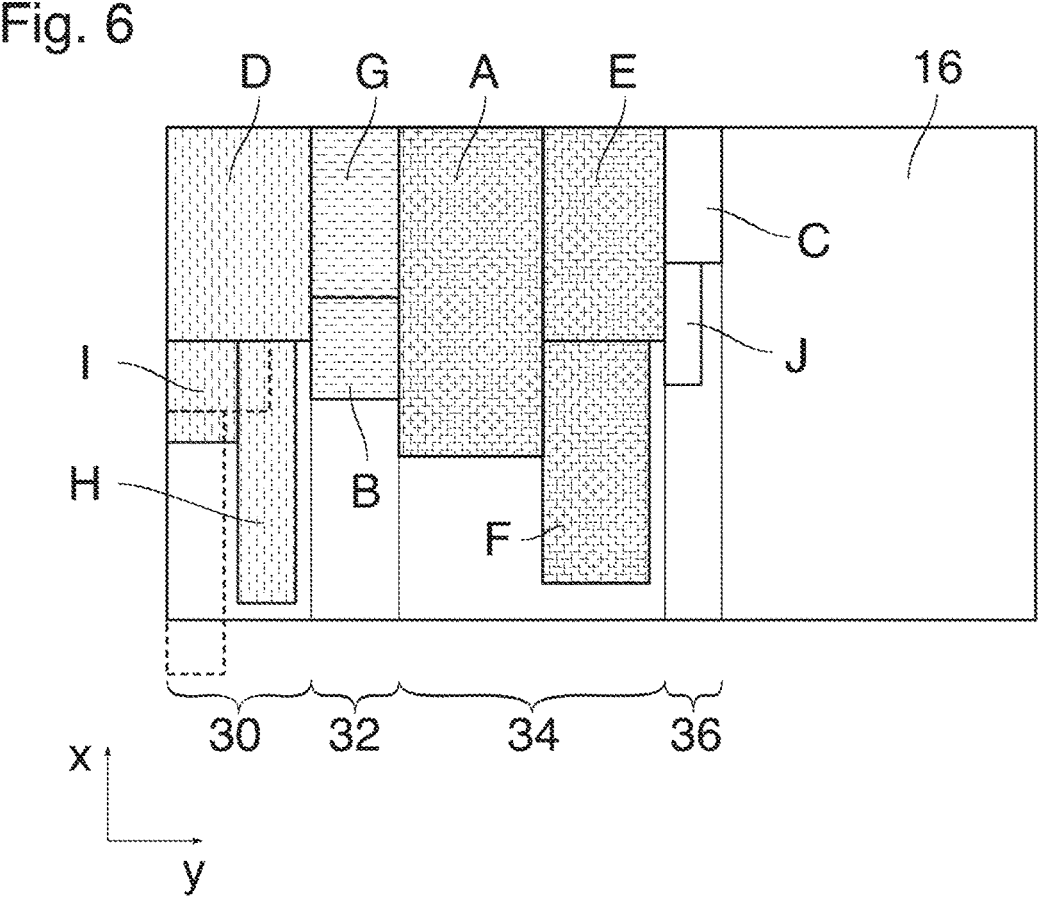
FIGS. 6 and 7 are a top plan view and a perspective view of a layout obtained by a method according to a another embodiment of the invention.
Figure 7:
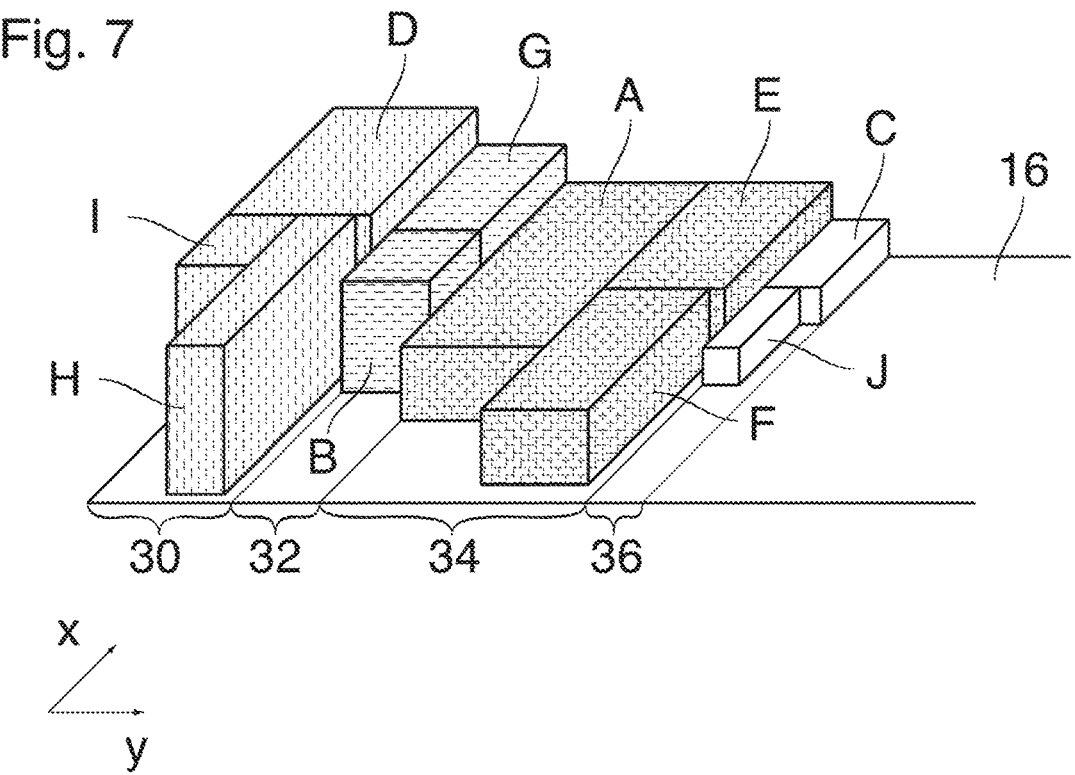

FIGS. 6 and 7 show another layout that has been obtained by a method according to a modified embodiment of the invention. Here, the print surface 16 has been divided into shelves 30, 32, 34 and 36, i.e. stripe-shaped areas that extend in the main scanning direction x. Each shelf includes only print objects with the same height. In the example shown the print objects have been sorted by non-increasing height, and the nesting process has started with the objects D, E and H with the largest height, which are accommodated in shelf 30. The process of nesting the print objects within a shelf can be based on well-known nesting algorithms for two-dimensional objects. For example, the two-dimensional nesting algorithm may comprise the following set of rules:

The print objects are sorted by non-increasing values of their shortest edge. In case of the objects D, H and I this would be the order D-I-H.

The objects are then placed within the shelves in that order. The first object to be placed (object B) is oriented such that its shortest edge extends in the sub-scanning direction y. The width of the object in the sub-scanning direction determines a width of a sub-shelf. In the example shown in FIG. 6, the shelf 30 comprises only a single sub-shelf.

If the next object to be placed (object I) fits into the sub-shelf in both orientations (which is the case for object I), it is tentatively placed in the orientation in which the shortest edge extends in the main scanning direction x (unlike the orientation shown in FIG. 6).

The further objects are packed adjacent to one another and successively in the main scanning direction, also with the shortest edge extending in the main scanning direction, if possible. If an object fits into the shelf or sub-shelf only in one orientation (as the object H), this object is placed in the orientation in which it fits. If there are so many objects to be placed that the available space of the sub-shelf in the main scanning direction x is exhausted, a new sub-shelf is opened, and the rules stated above apply also to that sub-shelf, i.e. the first object is placed in an orientation with the shortest edge extending in the sub-scanning direction y.

In the example shown, the above rules would have meant that the objects I and H were placed in positions shown in dashed lines in FIG. 6, and the object H would have exceed the boundary of the print surface 16 in the main scanning direction. It would therefore have been necessary to open another sub-shelf for accommodating the object H, which would have increased the width of the shelf 30. This is why an exemption rule has been applied to the objects I and H. As is shown in FIG. 6, the object H fits within the boundary of the print surface 16 if it is placed in a different layer than the object I, directly adjacent to the object D. In that case, however, it is preferable to rotate the object I by 90°, as shown in FIG. 6, in order to minimize the space requirement in the main scanning direction y. In the given example this has the advantageous effect, that all three objects can be accommodated in a common sub-shelf which has only the width of the shelf 30.

When all objects with the same height have been placed, the shelf is closed, and a new shelf 32 is opened for the objects G, B of the next lower height. The same rules as above apply for nesting the objects G and B within that shelf 32, and the same applies also to the nesting of the objects A, E and F in shelf 34 and the objects C, J in shelf 36. In the example shown, the shelf 34 comprises two sub-shelves accommodating the object A and the objects E and F, respectively.

Again, as is shown in FIG. 7, objects with equal height are grouped together. In this case, however, the objects of the same height are also accommodated in a common shelf with the smallest possible width. This has the advantage that no over-curing whatsoever will occur when the objects of the given height are printed. Moreover, the printing efficiency is increased further because all objects within a shelf will be completed at the same time, so that the print process can proceed to the next shelf and the completed objects can be cut and removed.

According to a generalization of the method described in conjunction with FIGS. 6 and 7, the requirement that all objects within a shelf must have the same height is replaced by the less strict requirement that the heights of the object within a shelf must all lie within a certain tolerance range the width of which will depend upon the curing properties of the ink. This modification has the consequence that minor over-curing (in an acceptable degree) may occur, but on the other hand, the number of shelves may be decreased and, consequently, the individual shelves will have a larger width which provides more flexibility for placing the objects within the shelves.

In the methods described in conjunction with FIGS. 6 and 7, it has been assumed that all objects to be printed fit within the print surface 16. The method may however be extended to a case where the number and sizes of the print objects are so large that the objects must be printed in several batches, each batch consisting of objects that fit on the print surface 16 together. In that case, the nesting process described above is continued regardless of the limited length of the print surface 16 in the sub-scanning direction y, and when the widths of all shelves have been determined, the shelves are combined into finite bins (each bin having the length of the print surface 16 in the sub-scanning direction y), using well known Best-Fit-Decreasing algorithms for a one-dimensional bin packing. Then, this one-dimensional packing algorithm will assure that the required number of batches is minimized.

Figure 8:
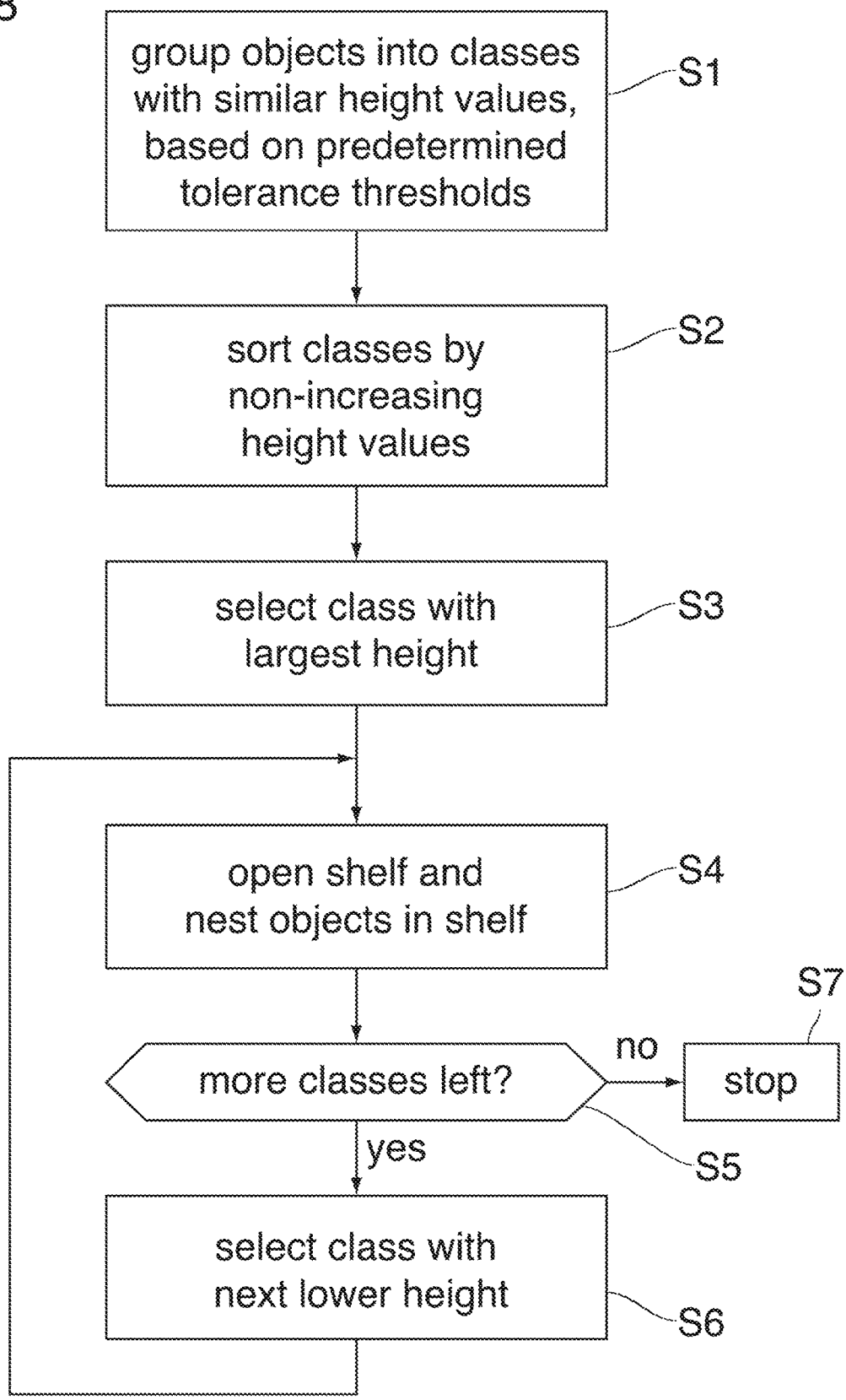
FIG. 8 a flow diagram illustrating an embodiment of the invention.

Essential steps of the method according to the invention will now be described in conjunction with the flow diagram shown in FIG. 8.

In step S1, the objects to be printed are grouped into classes with similar height values, based on predetermined tolerance thresholds. In the example shown in FIGS. 6 and 7, the tolerance thresholds are zero, so that all objects in a group have exactly the same height.

In step S2, the classes of objects are sorted by non-increasing height values.

Then, in step S3, the class with the largest height value is selected. In the example shown in FIGS. 6 and 7, this would be the class with the objects D, H and I.

In step S4, a shelf (shelf 30) is opened for the selected class of objects, and the objects are nested in that shelf, preferably by using a conventional nesting algorithm for two-dimensional objects.

Then it is checked in step S5 whether there are still any objects left and, consequently, there is at least one more class of objects to be nested. If that is the case ("yes"), the class of objects with the next lower height value is selected in step S6, and the process returns to step S4 for nesting the objects of that class. The steps S4, S5 and S6 are looped through until there are no more objects left (result "no" in step S5), and the process stops with step S7.

What is claimed is:

1. A method of nesting three-dimensional print objects on a print surface of a printer, wherein the locations for the print objects on the print surface are determined in view of the shape and size of the footprints of the objects so as to minimize the surface area required for accommodating the objects, and the locations for the print objects are determined also in view of intended heights of the objects, and objects with equal or similar height are grouped together, the method comprising a step of grouping the objects into classes of objects with similar heights, and a step of nesting the objects class by class,
    wherein the method is performed on a printer having a print head movable relative to the print surface in a main scanning direction and sub-scanning direction normal to the main scanning direction, and wherein
    the objects of each class are nested in a separate shelf that extends in the main scanning direction on the print surface and has a constant width in the sub-scanning direction.

2. The method according to claim 1, comprising a step of sorting the print objects by their intended height and nesting them in the sequence in which they have been sorted.

3. The method according to claim 2, wherein a known nesting algorithm for two-dimensional objects is used for nesting the objects of a class within the corresponding shelf.

4. A printer having a print controller configured to automatically perform the method according to claim 3.

5. The printer according to claim 4, the printer being a flat bed printer.

6. The printer according to claim 4, comprising a print head movable relative to the print surface, and at least one curing device movable together with the print head and arranged for applying a curing treatment to the printed objects.

7. A computer program product embodied on a non-transitory computer-readable medium, comprising program code which, when executed on a computer, causes the computer the method according to claim 3.

8. A printer having a print controller configured to automatically perform the method according to claim 2.

9. The printer according to claim 8, the printer being a flat bed printer.

10. The printer according to claim 8, comprising a print head movable relative to the print surface, and at least one curing device movable together with the print head and arranged for applying a curing treatment to the printed objects.

11. A computer program product embodied on a non-transitory computer-readable medium, comprising program code which, when executed on a computer, causes the computer the method according to claim 2.

12. The method according to claim 1, wherein a known nesting algorithm for two-dimensional objects is used for nesting the objects of a class within the corresponding shelf.

13. A printer having a print controller configured to automatically perform the methodaccording to claim 12.

14. The printer according to claim 13, the printer being a flat bed printer.

15. The printer according to claim 13, comprising a print head movable relative to the print surface, and at least one curing device movable together with the print head and arranged for applying a curing treatment to the printed objects.

16. A computer program product embodied on a non-transitory computer-readable medium, comprising program code which, when executed on a computer, causes the computer the method according to claim 12.

17. A printer having a print controller configured to automatically perform the method according to claim 1.

18. The printer according to claim 17, the printer being a flat bed printer.

19. The printer according to claim 17, comprising a print head movable relative to the print surface, and at least one curing device movable together with the print head and arranged for applying a curing treatment to the printed objects.

20. A computer program product embodied on a non-transitory computer-readable medium, comprising program code which, when executed on a computer, causes the computer the method according to claim 1.

* * * * *